United States Patent [19]
Fraser et al.

[11] Patent Number: 5,258,996
[45] Date of Patent: Nov. 2, 1993

[54] SPREAD SPECTRUM APPARATUS

[75] Inventors: Ronald H. Fraser, Gilroy; Cornelius S. Constantine, Morgan Hill, both of Calif.

[73] Assignee: Voyager Technologies, Inc., Morgan Hill, Calif.

[21] Appl. No.: 916,339

[22] Filed: Jul. 17, 1992

[51] Int. Cl.$^5$ .......................... H04K 1/00; H04L 27/30
[52] U.S. Cl. .......................... 375/1; 342/200; 380/31; 380/34
[58] Field of Search .............. 375/1; 342/200; 380/34, 380/32, 31

[56] References Cited

U.S. PATENT DOCUMENTS

| | | | |
|---|---|---|---|
| 4,231,113 | 10/1980 | Blasbalg | 375/1 X |
| 5,121,407 | 6/1992 | Partyka et al. | 375/1 |
| 5,150,377 | 9/1992 | Vannucci | 375/1 |

OTHER PUBLICATIONS

Irvin, D. R. "FM Angle Modulator with Frequency Compensated Deviation", IBM Technical Disclosure Bulletin, vol. 21, No. 6, Nov. 1978, (2482-2483).

*Primary Examiner*—Gilberto Barrón, Jr.
*Attorney, Agent, or Firm*—Fliesler, Dubb, Meyer & Lovejoy

[57] ABSTRACT

For use in a spread spectrum communication system there is provided in an embodiment of the invention a spread spectrum transmitter which uses a voltage controlled oscillator (VCO) for generating a carrier signal wherein the frequency of the oscillator is controlled by the output of a correlation code generator and data generator coupled to a varactor in the oscillator. The use of a VCO eliminates the need for sidelobes associated with mixers. In another embodiment the separation of the output of the correlation code generator and data generator coupled to the varactor and the output of a phase detector coupled to the varactor simplifies tuning of the transmitter and in another embodiment the use of a high gain differential amplifier to couple the output of the correlation code generator and data generator to the varactor eliminates tuning the transmitter. In each of the above embodiments, modulating the VCO with a special code as the VCO is coming up to speed, reduces interference with other narrowband receivers. In a spread spectrum receiver there is provided a separate narrow band channel for locking the receiver to a signal received from a transmitter and a separate channel for recovering data from the received signal. The use of the separate channels provide a high interference immunity as well as easier and faster locking and data recovery.

14 Claims, 5 Drawing Sheets

FIG. 4

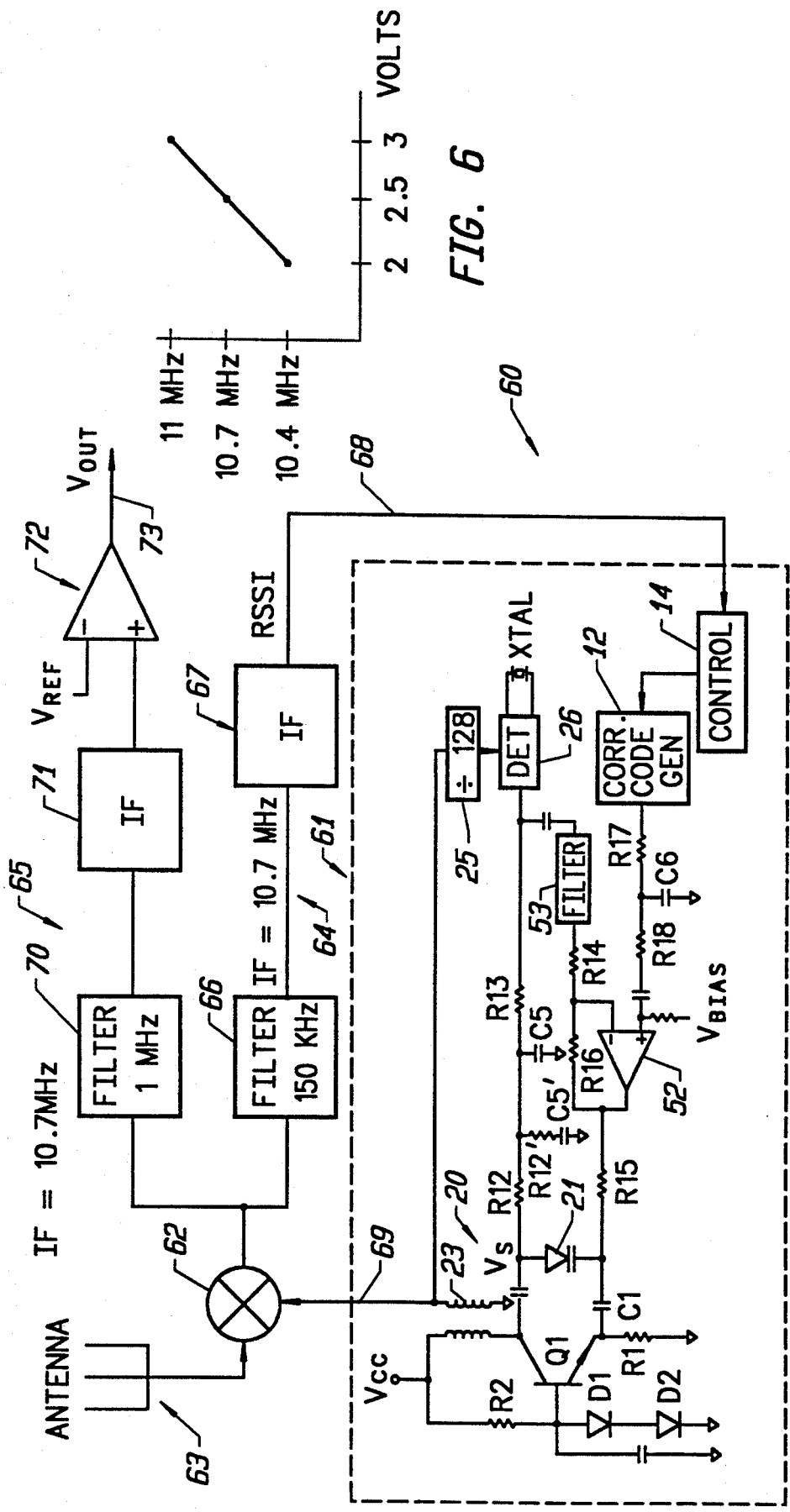

SPREAD SPECTRUM APPARATUS

BACKGROUND OF THE INVENTION

1. Related Application

This application is a continuation of U.S. Pat. application Ser. No. 07/889,719, filed May 27, 1992 now abandoned.

2. Field of the Invention

The present invention relates to spread spectrum transmitters and receivers in general and in particular to a method and apparatus comprising a spread spectrum transmitter having a carrier signal provided by a voltage controlled oscillator, the frequency of which is modulated by the output from a correlation code and data generator, and a spread spectrum receiver having separate channels for, respectively, locking the receiver to the transmitter and recovering data.

3. Description of the Related Art

In spread spectrum communication systems, a carrier signal and the information./data impressed on the carrier signal is spread over a wide range of frequencies. To enable multiple transmitters and receivers to operate over the same frequency band with a minimum of interference, it has been the practice to modulate the carrier in the transmitter with a code, e.g. pseudo-random binary code, and to demodulate the carrier in the receiver with the same code and thus lock the receiver to the transmitter using combined code shifting and crosscorrelation techniques. Thereafter, data which has also been impressed on the carrier can be recovered.

Heretofore, a number of problems have been encountered in spread spectrum transmitters. For example, when a transmitter is first turned on, the output frequency of its local oscillator typically changes over a wide range for a period of time until the oscillator comes up to its center frequency or until a voltage controlled oscillator (VCO) in a phase-locked loop (PLL) in which a crystal serves as a reference can be locked to the crystal frequency. This time can be as long as 20 milliseconds (msec.) in many systems. In a spread spectrum system this change in carrier frequency ca result in interference with other narrowband receivers and be a source of interfering noise to a receiver which may be receiving data at the time.

In a typical conventional direct sequence spread spectrum system, a VCO in a PLL as described above or a standard multiplier chain is used to create a carrier signal having a nominal center frequency, e.g. 915 MHz, in a predetermined frequency range, e.g. 902 MHz to 928 MHz. This single frequency is then mixed with a correlation code from a correlation code generator and with data from a data generator. The mixing of the correlation code with the carrier signal can involve amplitude modulation, phase modulation or frequency modulation. The data may be mixed with the carrier signal either before or after the correlation code is mixed therewith.

The mixing of the correlation code and data with the carrier signal has a number of disadvantages. For example, it requires the use of mixers which tend to be expensive electronic components. Also, the mixing of the correlation code and data with the carrier signal causes sidelobes which can lead to false code signal synchronization, i.e. false receiver locks, and wasted energy.

Another problem encountered in prior known spread spectrum transmitters which use a VCO for generating a carrier signal is that certain components in the carrier modulation circuits in different transmitters can produce unpredictable deviations in the carrier frequency for given voltages applied to the varactor, thus requiring expensive and time consuming tuning procedures to enable multiple transmitters to communicate with a given receiver.

Known spread spectrum receivers also have problems. For example, conventional spread spectrum receivers typically employ combined locking and data recovery circuits and techniques which can be susceptible to interference, i.e. undesirable large numbers of false locks, and slow locks.

SUMMARY OF THE INVENTION

In view of the foregoing, principal objects of the present invention are a method and apparatus comprising a novel and improved spread spectrum transmitter and receiver which eliminates or reduces the extent of the above described problems heretofore encountered in conventional spread spectrum systems.

In one embodiment of a spread spectrum transmitter according to the present invention different correlation codes are used in the transmitter to modulate the transmitter carrier depending on the status of the transmitter. For example, a first code which differs from all other codes used in the receivers in the system is used during the time the local carrier generator in the transmitter is coming up to its center frequency after being turned on and a second code which can be correlated with a code in a receiver in the system is used after the transmitter carrier signal has obtained its nominal center frequency.

The advantage of this embodiment of the present invention is that by using the first and second codes, the transmitter will not interfere with other narrow band systems as the crystal or PLL is coming up to speed and its output will look like noise to a receiver in the system. In practice, the second code is used after a predetermined period, e.g. 5 msec., in which the carrier is assumed to have obtained its center frequency.

In another embodiment of a spread spectrum transmitter according to the present invention, the carrier signal generator comprises a voltage controlled oscillator (VCO) having a varactor for generating the carrier signal. In this embodiment, the correlation code and data in the transmitter are added at a summing node to the error signal from the phase detector in the PLL and applied to the plate of the varactor to control the potential across the varactor and thereby effect a corresponding deviation in the frequency of the carrier signal. As will be apparent, this method and apparatus eliminates the need for mixers and creates a correlation code and data frequency modulated carrier signal with no sidelobes. It will also be appreciated that by using this technique the magnitude of the deviation in the frequency of the carrier signal can be adjusted for each bit of the correlation code and data by adjusting the magnitude of the potential across the varactor due to each code and data bit so that the spreading of the carrier is not dependent on the correlation code or data rate as is the case when mixers are used.

A preferred feature of this embodiment of the present invention is that the output of the correlation code generator is integrated so as to smooth the changes in potential across the varactor. This causes the transmitter output signal and the signals in the receiver to look more noise like, except when a lock is achieved.

In the above described embodiment, each of the outputs of the phase detector, code generator and data generator is coupled to the plate of the varactor by means of an RC network comprising a plurality of variable resistors. To compensate for differences in performance of the components in the carrier generator, code generator and data generator from transmitter to transmitter, it is necessary to tune each transmitter, i.e. adjust the variable resistors. Because the outputs of the phase detector, code generator and data generator interact at the plate of the varactor, the adusting of the variable resistors has been tedious and time consuming.

In another embodiment of a spread spectrum transmitter according to the present invention which is intended to simplify the tuning of the transmitter to compensate for deviations in component performance as described above, a first error signal is applied to the plate of the varactor and a second error signal is applied to the cathode of the varactor. The first error signal is generated using a PLL in a conventional manner as described above. The second error signal is provided by integrating the output of the correlation code generator and the output of the data generator and applying their sum to the cathode of the varactor. By separating the two error signals into first and second paths, the outputs of the code and data generators no longer interact with the output of the phase detector thereby simplifying the tuning of the transmitter, i.e. the adjusting of the variable resistors at the outputs of the phase detector, code generator and data generator.

In another embodiment of a spread spectrum transmitter according to the present invention a means is provided to eliminate the need for tuning the transmitter altogether. In this embodiment a first error signal is applied to the plate of the varactor and a second error signal is applied to the cathode of the varactor. The first error signal is generated using a PLL in a conventional manner as described above. However, in this embodiment the second error signal applied to the cathode of the varactor is provided at the output of a high gain differential amplifier by applying the first error signal to a first input of the amplifier and the sum of an integrated output of the correlation code generator and an output of the data generator to a second input of the amplifier. By separating the two error signals into a first path having a slow response time and a second path having a very fast response time, the slope of the first path provides the deviation caused by the correlation code or data which the second path quickly attempts to null. As can be seen, this technique creates a system wherein the deviation of the carrier frequency is controlled by the correlation code and data rather than being dependant on component tolerances or tuning.

In still another embodiment of the present invention there is provided a spread spectrum receiver comprising a VCO for providing a local oscillator signal having a frequency which changes in response to the output of a correlation code generator, means for shifting the phase of the output of the correlation code generator relative to a signal being received from a transmitter, a first channel for locking the receiver to a transmitter and a second channel for recovering data after the receiver is locked to the transmitter. In the first channel there is provided a narrow band filter, e.g 150 KHz, and a received signal strength indicator for providing an output signal to terminate the shifting of the output of the correlation code generator and lock the receiver to the transmitter when a predetermined correlation is achieved between the code modulated local oscillator signal and the received signal. In the second channel there is provided a filter having a predetermined bandwidth, e.g. 1 MHz, a quadrature detector and a comparator for providing a digital data output corresponding to the data received from the transmitter after the receiver has been locked to the transmitter.

The advantages of this receiver is that it has high interference immunity and provides easier and faster locking and data recovery due to the use of separate locking and data recovery channels.

BRIEF DESCRIPTION OF THE DRAWINGS

The above and other objects, features and advantages of the present invention will become apparent from the following detailed description of the accompanying drawings, in which:

FIG. 4 is a block diagram and schematic of still another embodiment of a spread spectrum transmitter according to the present invention;

FIG. 5 is a block diagram and schematic of an embodiment of a spread spectrum receiver according to the present invention, and FIG. 6 is a diagram of frequency versus voltage at the output of the quadrature detector in the data recovery channel of the receiver of FIG. 5.

DESCRIPTION OF THE PREFERRED EMBODIMENTS

Figure 1:
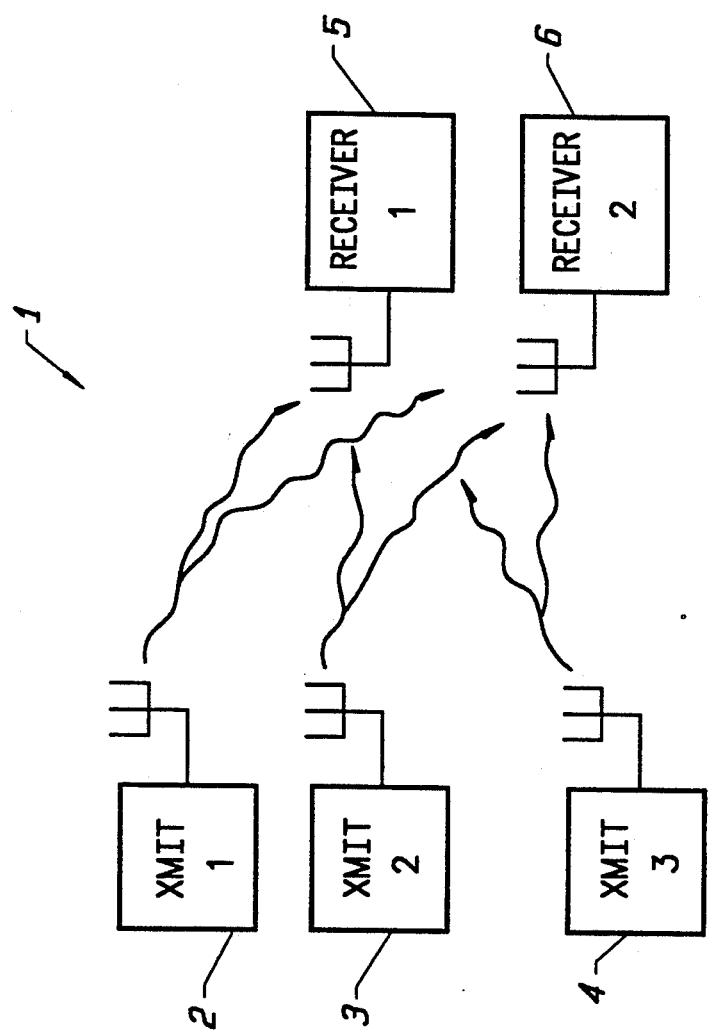
FIG. 1 is a block diagram of a spread spectrum system comprising a plurality of transmitters and receivers.

Referring to FIG. 1, there is provided a block diagram of a spread spectrum system designated generally as 1 comprising a plurality of transmitters 2, 3 and 4 and a plurality of receivers 5 and 6.

As is well known, in a spread spectrum communications system a carrier signal and the information/data impressed on the carrier signal is spread over a wide range of frequencies. To enable multiple transmitters, such as transmitters 2–4, and receivers, such as receivers 5 and 6, to operate over the same frequency band with a minimum of interference, it has been the practice to modulate the carrier in the transmitter with a code such as, for example, a pseudo-random binary code, to demodulate the carrier in the receiver with the same code and thereafter locking the receiver to the transmitter using combined code-shifting and cross correlation techniques.

Figure 2:
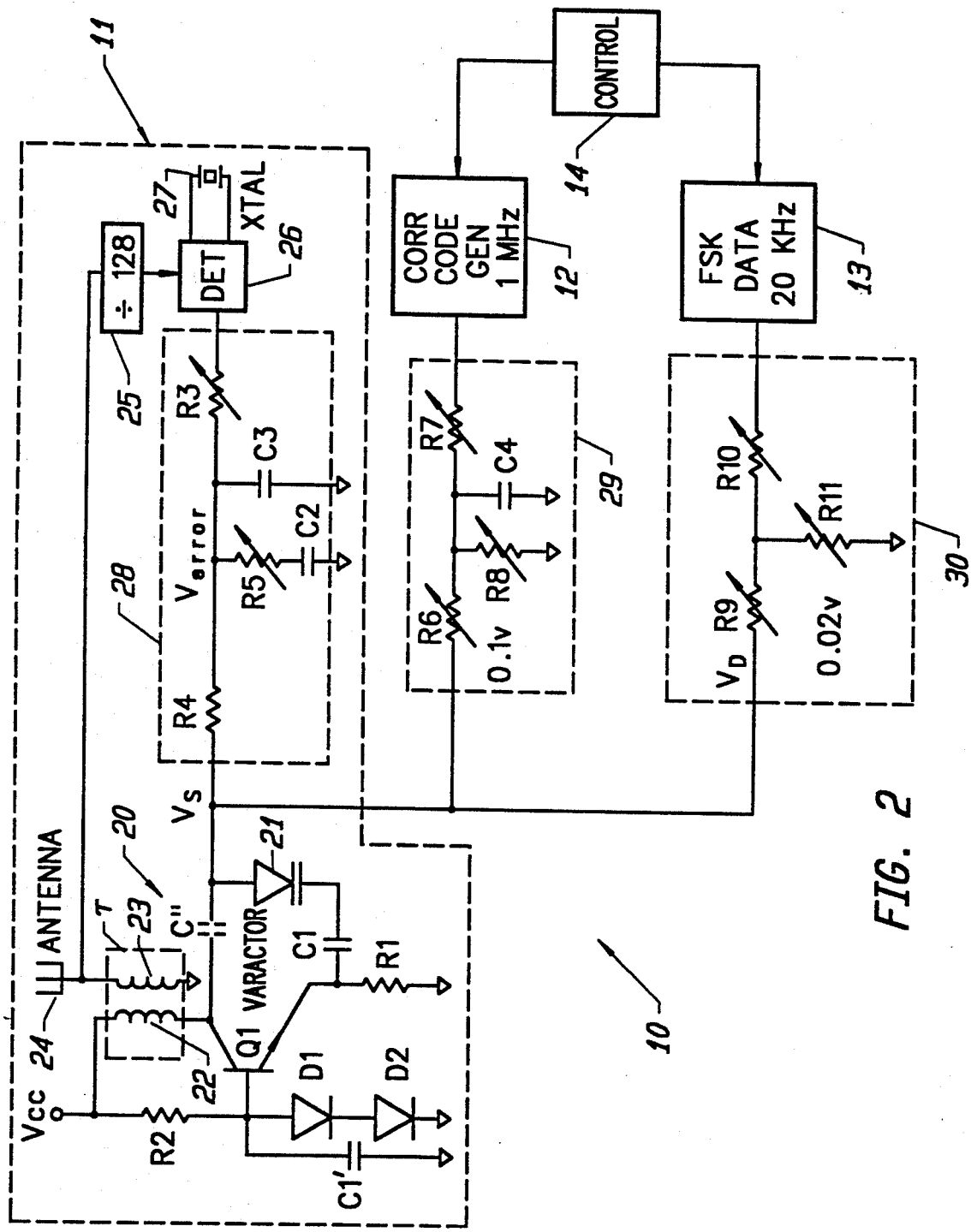
FIG. 2 is a block diagram and schematic of an embodiment of a spread spectrum transmitter according to the present invention.

Referring to FIG. 2, there is provided in accordance with the present invention a spread spectrum transmitter designated generally as 10 comprising a phase-locked loop (PLL) designated generally as 11, a correlation code generator 12, a data generator 13 and a control circuit 14. In the PLL 11 there is provided a voltage controlled oscillator (VCO) designated generally as 20. In the VCO 20 there is provided a transistor Q1 and varactor 21. The cathode of the varactor 21 is coupled to ground through a capacitor C1 and a resistor R1. The emitter of the transistor Q1 is coupled to ground through the resistor R1. The base of the transistor Q1 is coupled to a source of potential $V_{CC}$ through a resistor R2 and to ground through a pair of diodes D1 and D2 and a capacitor C1'. The collector of transistor Q1 is coupled to the source $V_{CC}$ through the primary 22 of a transformer designated generally as T. The secondary 23 of the transformer T is coupled between ground and an antenna 24 and through a prescaler, i.e. divider, 25 in the phase-locked loop 11. The output of the divider 25 is coupled to a phase detector 26. A crystal 27 is coupled to the phase detector 26 for providing a reference frequency to the detector 26. The output of the detector 26 is coupled to a summing node $V_S$ at the plate of the varactor 21 through an RC network designated generally as 28. The RC network 28 comprises resistor R4, a pair of variable resistors R3 and R5 and a pair of capacitors C2 and C3. The node $V_S$ is coupled to the collector of Q1 through a capacitor C".

The output of the correlation code generator 12 is coupled to the summing node $V_S$ through an RC network designated generally as 29. In the network 29 there is provided a plurality of variable resistors R6, R7 and R8 and a capacitor C4.

The data generator 13 is coupled to the summing node $V_S$ by means of a resistor network designated generally as 30. In the resistor network 30 there is provided a plurality of variable resistors R9, R10 and R11. The control circuit 14 is coupled to the correlation code generator 12 and the data generator 13 for controlling the two generators.

In operation, the VCO 20 provides a carrier signal on the antenna 24 having a predetermined nominal frequency, e.g. 1.15 MHz.

The frequency of the VCO 20 is determined by the potential applied across the varactor 21 and specifically the voltage at the summing node $V_S$ at the plate of the varactor 21. As is well known, any deviation in the frequency of the VCO 20 will be sensed by the phase detector 26 which will generate an error signal at the summing node VCS to cause the VCO to return to its predetermined frequency.

In the present invention advantage is taken of the fact that the VCO reacts to the voltage impressed across the varactor 21 to change the VCO frequency. Accordingly, the correlation code generator 12 produces at the summing node $V_S$ a predetermined sequence of binary signals, preferably a pseudo-random code generated by a pseudo-random number generator. For example, in the present invention the correlation code generator 12 provides a bit stream having a bit rate of 1 MHz. The value of the resistors R6-R8 is adjusted such that a 0.1 volt change at the summing node $V_S$ due to the output of the correlation code generator 12 will result in a 3 MHz spread in the frequency of the output of the VCO 20. Similarly, the value of the resistors R9-R11 in the resistor network 30 at the output of the data generator 13 is adjusted such that a maximum change of potential of 0.02 volts due to data at the output of the data generator 13 will effect a change of 600 KHz in the frequency of the VCO 20. Thus the combined effect of the correlation code generator 12 and the data generator 13 will cause the frequency of the VCO to vary from 913.2 MHz to 916.8 MHz or 915 MHz ±1.8 MHz.

An important feature of the present invention is the presence of the capacitor C4 at the output of the correlation code generator 12. By adding the capacitor C4 at the output of the correlation code generator 12, the output of the correlation code generator 12 is integrated so that the voltage changes across the varactor 21 results in a substantially uniform power output over the frequency range of 913.2 MHz to 916.8 MHz.

In considering the transmitter 10 of FIG. 2, it is important to note that the spread spectrum signal provided by the transmitter 10 is provided without sidelobes and that the null-to-null bandwidth is no longer dependent upon the pulse rate of the correlation code and data generators but is solely dependent upon the voltage applied to the summing node $V_S$. By eliminating mixers to generate the carrier signal, the transmitter 10 is cheaper. The elimination of sidelobes makes it more powerful and more efficient with less filtering and provides for more interference resistance to CW or other wideband jamming and allows the transmitter to coexist with other spread spectrum systems without interfering with them. However, as indicated above, the interaction of the outputs of the code and data generators with the output of the phase detector tends to make tuning of the transmitter tedious and time consuming as the adjustment of one variable resistor requires adjustment of another, and so forth.

Figure 3:
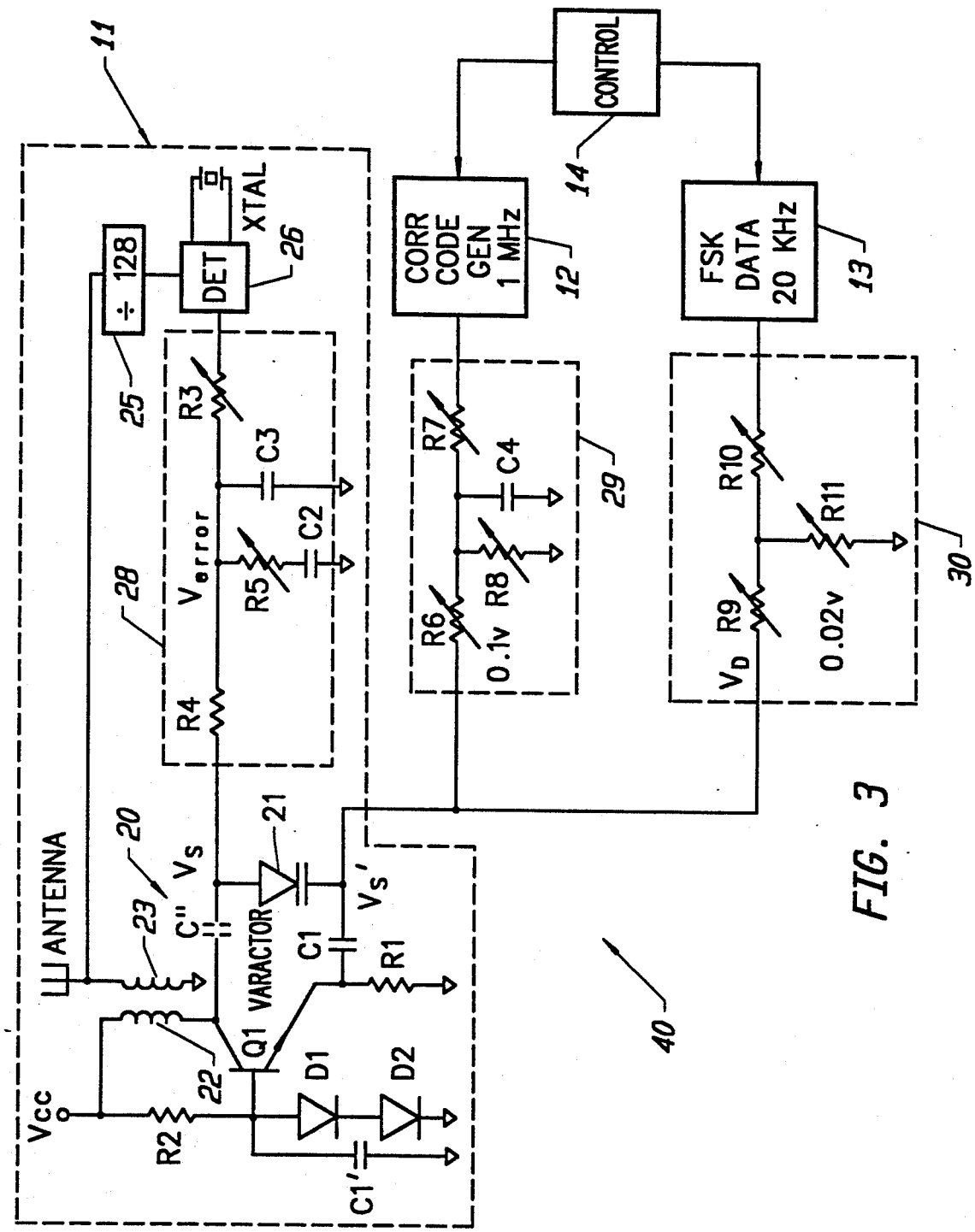
FIG. 3 is a block diagram and schematic of another embodiment of a spread spectrum transmitter according to the present invention.

Referring to FIG. 3, there is provided in another embodiment of the present invention a spread spectrum transmitter designated generally as 40 in which all of the components are identical to those disclosed and described above with respect to the transmitter 10 of FIG. 2 with the exception that the outputs from the correlation code generator 12 and the data generator 13 are isolated from the output of the phase detector 26 and applied to a second summing node $V_S'$ located at the cathode of the varactor 21.

By isolating the error signal due to the output of the phase detector 26 from the error signal due to the output of the correlation code generator 12 and data generator 13, the timing of the transmitter is simplified in that the adjustment of the resistors in the network 28 does not necessarily require an adjustment of the resistors in the networks 29 and 30.

Figure 4:
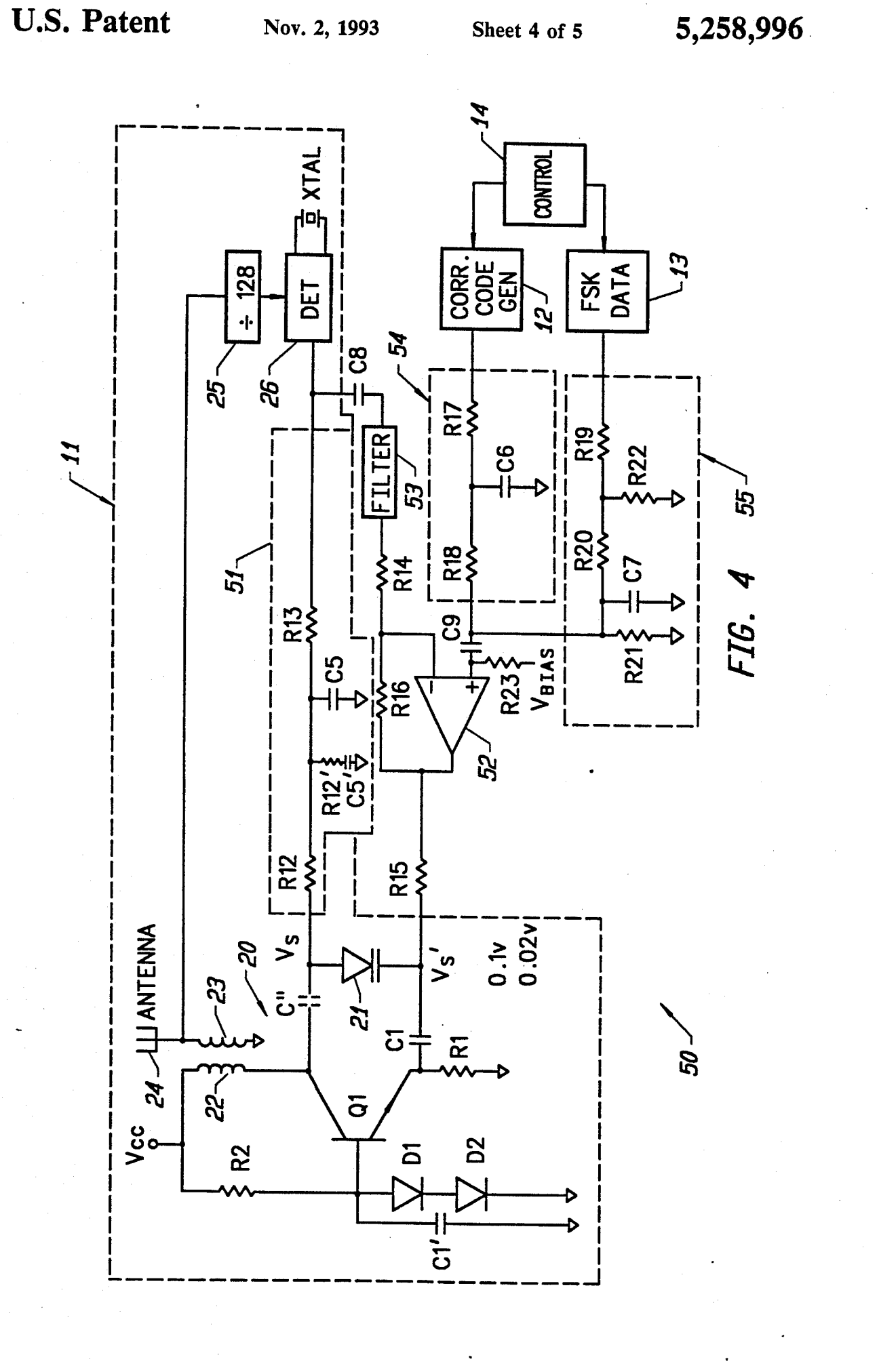

Referring to FIG. 4, there is provided in another embodiment of the present invention a spread spectrum transmitter designated generally as 50. The transmitter 50 is substantially identical to the transmitter 40 of FIG. 3 with the following exceptions. The RC network 28 of the PLL 11 of FIG. 3 is replaced by an RC network 51 comprising resistors R12, R12' and R13 and a capacitor C5 and C5' which couples the output of the detector 26 to the summing node $V_S$ at the plate of the varactor 21. There is further provided in the transmitter 50 a high gain differential amplifier 52 having an inverted and a non-inverted input and an output. The inverted input is coupled to the output of the detector 26 through a resistor R14, a filter 53 and a capacitor C8 and to the output of the amplifier 52 through a resistor R16. The output of the amplifier 52 is coupled to the summing node $V_S'$ at the cathode of the varactor 21 by means of a resistor R15. The output of the correlation code generator 12 is coupled to the non-inverting input of the amplifier 52 by means of a capacitor C9 and an RC network 54 comprising a pair of resistor R17 and R18 and a capacitor C6. Similarly, the data generator 13 is coupled to the non-inverting input of the amplifier 52 by means of the capacitor C9 and an RC network 55 comprising a plurality of resistors R19, R20, R21 and R22 and a capacitor C7. A d-c bias potential is provided to the non-inverting input through a resistor R23.

In practice, the value of the resistances R3-R11 is chosen so as to provide at the summing node $V_S'$ in response to the output of the correlation code generator 12 a maximum change in potential of 0.1 volts corresponding to a maximum deviation of the frequency of the VCO 20 of 3 MHz and in response to the output of the data generator 13 a maximum change in potential of 0.02 volts corresponding to a maximum deviation in the frequency of the output of the VCO 20 of 600 KHz.

In addition to the advantages described above, the transmitter of FIG. 4 has the further advantage that the use of the high gain differential amplifier 52 and the RC networks 51, 54 and 55, as described above, eliminates the need for tuning the amplifier to compensate for differences in component performance from one transmitter to another. By eliminating the need for tuning the transmitter, there is no longer a need for variable resistors or for skilled technicians to tune the transmitter, thus providing an overall savings in time and money.

In each of the above-described transmitters of FIGS. 2-4, the correlation code generator 12 is provided to output one of two correlation codes depending on the status of the transmitter. For example, during a predetermined period, e.g. 5 msec., after the VCO in the transmitter is turned on and begins outputting a carrier signal, the carrier signal is modulated by a first code which differs from all other codes used in the receivers. After this period of time, the carrier signal is modulated by a second code which is recognizable by a receiver in the system. In this manner, the transmitter will not interfere with other narrowband systems as the VCO is coming up to speed and its output will not correlate with any of the receiver codes.

Referring to FIG. 5, there is provided in accordance with the present invention a spread spectrum receiver designated generally as 60. In the receiver 60 there is provided a local oscillator designated generally as 61 coupled to a first input of a mixer 62. A second input of the mixer 62 is coupled to an antenna 63 for receiving signals from a spread spectrum transmitter. The output of the mixer 62 is coupled to a receiver locking channel 64 and a data recovery channel 65. In the receiver locking channel 64 there is provided a first narrow band filter 66 having a predetermined bandwidth, e.g. 150 KHz, centered at a predetermined center frequency, e.g. 10.7 MHz. The output of the filter 66 is coupled to an intermediate frequency (IF) circuit 67 having a received signal strength detection circuit for providing at the output thereof a control signal on a control signal line 68 for controlling the shifting of the correlation code generator in the local oscillator 61, as will be further described below, when there is a predetermined correlation between the output of the local oscillator 61 and the input received from the transmitter from the antenna 63 in the mixer 62.

In the data recovery channel 65 there is provided a second filter 70 having a predetermined bandwidth, e.g. 1 MHz, centered at the center frequency of the filter 66, i.e. 10.7 MHz. The output of the filter 70 is coupled to an IF circuit 71 which comprises a frequency to voltage converter for converting the output of the filter 70 to a predetermined voltage as illustrated in FIG. 6.

As shown in FIG. 6, in operation when the IF signal at the output of filter 70 comprises 10.4 MHz, the output of the frequency to voltage converter 71 comprises 2 volts and when the IF signal of the output of the filter 70 increases to 11 MHz, the maximum deviation effected by a 600 KHz shift in carrier frequency, the voltage at the output of the circuit 71 is 3 volts. The output of the circuit 71 is applied to one input of a voltage comparator. A reference voltage of 2.5 volts is applied to a second input.

In operation, as the output of the circuit 71 is driven above 2.5 volts, the output of the comparator 72 is driven to a logical high and as the output of the circuit 71 is driven below 2.5 volts, the output of the comparator 72 is driven to a logical low, e.g. 2 volts. In this manner, the output of the comparator 72 corresponds to the data received by the receiver 60.

Referring to the local oscillator 61, it will be noted that the local oscillator 61 is identical to the transmitter 50 as shown in FIG. 4 except that the antenna 24 in the transmitter 50 of FIG. 4 is replaced by an output signal line 69 for coupling the secondary 23 in the VCO 20 to the mixer 62. In addition, the data generator 13 and associated RC network 55 are omitted.

In operation, a signal received on the antenna 63 is applied to the mixer 62 and mixed with an output from the local oscillator 61. The correlation code generator 12 in the local oscillator 61 is provided to output a correlation code which is identical to the correlation code used in one of the spread spectrum transmitters in the spread spectrum communication system in which the receiver is located. As the signal from the transmitter is received at the mixer 62, the control circuit 14 shifts the phase of the output of the correlation code generator 12. As this is taking place, the output of the mixer 62 is being filtered by the filter 66. When there is a predetermined correlation between the phase of the correlation code in the signal from the local oscillator 61 and the phase of the correlation code in the received signal, the circuit 67 generates an output signal on the control signal line 68 which is applied to the control circuit 14 for terminating the shifting of the correlation code generator 12 in the local oscillator 61 and thus locking the receiver to the transmitter. When the shifting of the correlation code generator 12 is terminated and the receiver is locked to the transmitter, the receiver 60 is in condition to recover the data in the data recovery channel 65 by filtering the output of the mixer 62 and generating the data output signal on the line 73 as described above.

The advantage of the receiver 60 of the present invention is that the separation of the locking channels and the data recovery channels provides for high interference immunity as well as easier and faster locking due to the narrowband locking channel and the wideband data detection channel.

While preferred embodiments of the present invention are described above, it is contemplated that numerous modifications may be made thereto for particular applications without departing from the spirit and scope of the present invention. Accordingly, it is intended that the embodiments described be considered only as illustrative of the present invention and that the scope thereof should not be limited thereto but be determined by reference to the claims hereinafter provided.

What is claimed is:

1. For use in a spread spectrum system having a transmitter and a receiver, a spread spectrum transmitter comprising;

means including a voltage controlled oscillator (VCO) for generating a carrier signal having a predetermined nominal frequency, sad VCO including a varactor having a plate and a cathode wherein said plate is coupled to the output of a phase detector; and means coupled to said varactor for modulating the carrier signal wherein said modulating means comprises a correlation code generator and a data signal generator coupled to said cathode.

2. For use in a spread spectrum system having a transmitter and a receiver, a spread spectrum transmitter comprising:
means including a voltage controlled oscillator (VCO) for generating a carrier signal having a predetermined nominal frequency, said VCO including a varactor having a plate and a cathode wherein said plate is coupled to the output of a phase detector; and
means coupled to said VCO for modulating the carrier signal wherein said modulating means comprises a correlation code generator coupled to said cathode.

3. For use in a spread spectrum system having a transmitter and a receiver, a spread spectrum transmitter comprising:
a voltage controlled oscillator (VCO) including a varactor having a plate and a cathode for generating a carrier signal having a predetermined nominal frequency, said plate being coupled to the output of a phase detector; and
means coupled to said VCO for modulating the carrier signal wherein said modulating means comprises:
a high gain amplifier having a first and second input and an output;
means for coupling the output of the phase detector to the first input of the high gain amplifier;
a correlation code generator;
means for coupling the correlation code generator to the second input of the high gain amplifier; and
means for coupling the output of the high gain amplifier to said cathode.

4. A spread spectrum transmitter according to claim 3 wherein said modulating means comprises:
a means for generating a data signal; and
means for coupling said data signal generating means to said second input of the high gain amplifier.

5. A spread spectrum transmitter according to claim 3 wherein said means for coupling the output of the phase detector to the first input of the high gain amplifier comprises filter means.

6. A spread spectrum transmitter according to claim 3 wherein said means for coupling the correlation code generator to the second input of the high gain amplifier comprises means for integrating the output of the correlation code generator.

7. A spread spectrum transmitter according to claim 4 wherein said means for coupling the data signal generator to the second input of the high gain amplifier comprises means for integrating the output of the data signal generator.

8. A method of generating a spread spectrum signal comprising the steps of:
generating a carrier signal having a predetermined nominal frequency using a voltage controlled oscillator (VCO) having a varactor with a plate and a cathode; and
modulating the carrier signal by changing the frequency of the VCO as a function of a predetermined sequence of binary signals by applying the predetermined sequence of binary signals to the varactor wherein said step of applying binary signals comprises the steps of applying the output of a phase detector to said plate and the output of a correlation code generator and a data signal generator to said cathode.

9. A method of generating a spread spectrum signal comprising the steps of:
generating a carrier signal having a predetermined nominal frequency using a voltage controlled oscillator (VC) including a varactor having a plate and a cathode; and
modulating the carrier signal by changing the frequency of the VCO as a function of a predetermined sequence of binary signals wherein said step of change the frequency of the VCO comprises the steps of applying the output of a phase detector to said plate and the output of a correlation code generator to said cathode.

10. A method of generating a spread spectrum signal comprising the steps of:
generating a carrier signal having a predetermined nominal frequency using a voltage controlled oscillator (VCO) including a varactor having a plate and a cathode; and
modulating the carrier signal by changing the frequency of the VCO as a function of a predetermined sequence of binary signals by applying the predetermined sequence of binary signals to the varactor wherein said step of applying the binary signals comprises the steps of applying the output of a phase detector to said plate and a first input of a high gain amplifier;
coupling the output of a correlation code generator to the second input of the high gain amplifier; and
coupling the output of the high gain amplifier to said cathode.

11. A method according to claim 10 wherein said step of modulating the carrier signal further comprises the steps of:
generating a data signal; and
coupling said data signal to said second input of the high gain amplifier.

12. A method according to claim 10 wherein said step of coupling the output of the phase detector to the first input of the high gain amplifier comprises the step of coupling the output of the phase detector to the first input of the high gain amplifier through a filter means.

13. A method according to claim 10 wherein said step of coupling the correlation code generator to the second input of the high gain amplifier comprises the step of integrating the output of the correlation code generator.

14. A method according to claim 12 wherein said step of coupling the data signal to the second input of the high gain amplifier comprises the step of integrating the output of the data signal generator.

* * * * *